United States Patent
Jiang et al.

(10) Patent No.: US 9,745,501 B1
(45) Date of Patent: Aug. 29, 2017

(54) ADDITIVE COMPOSITION SUITABLE FOR VISCOSITY REDUCTION OF OIL-BASED DRILLING FLUID, OIL-BASED DRILLING FLUID AND USE THEREOF

(71) Applicant: CHINA UNIVERSITY OF PETROLEUM (BEIJING), Beijing (CN)

(72) Inventors: Guancheng Jiang, Beijing (CN); Shuanglei Peng, Beijing (CN); Yinbo He, Beijing (CN); Zhengqiang Deng, Beijing (CN); Lili Yang, Beijing (CN); Fan Liu, Beijing (CN); Deli Gao, Beijing (CN); Xinliang Li, Beijing (CN); Yawei Shi, Beijing (CN); Kai Wang, Beijing (CN); Chunlei Wang, Beijing (CN); Guangchang Ma, Beijing (CN); Li Zhao, Beijing (CN); Gang Qu, Beijing (CN)

(73) Assignee: China University of Petroleum (Beijing), Beijing (CN)

(*) Notice: Subject to any disclaimer, the term of this patent is extended or adjusted under 35 U.S.C. 154(b) by 0 days.

(21) Appl. No.: 15/466,032

(22) Filed: Mar. 22, 2017

(30) Foreign Application Priority Data

Aug. 25, 2016 (CN) .......................... 2016 1 0726964

(51) Int. Cl.
  *C09K 8/28* (2006.01)
  *C09K 8/60* (2006.01)
  *C09K 8/528* (2006.01)
  *C09K 8/32* (2006.01)
  *C09K 8/035* (2006.01)
  *C08F 293/00* (2006.01)

(52) U.S. Cl.
  CPC ............ *C09K 8/32* (2013.01); *C08F 293/005* (2013.01); *C09K 8/035* (2013.01); *C09K 2208/34* (2013.01)

(58) Field of Classification Search
  CPC ....... C09K 8/32; C09K 8/035; C09K 2208/34
  USPC .................................. 507/131, 219, 222, 224
  See application file for complete search history.

(56) References Cited

U.S. PATENT DOCUMENTS

| 3,686,109 | A | * | 8/1972 | Aldrich | .................. C08L 57/00 210/728 |
|---|---|---|---|---|---|
| 4,501,672 | A | | 2/1985 | Connell | |
| 7,772,165 | B2 | | 8/2010 | Knox | |
| 9,365,762 | B1 | | 6/2016 | Jiang | |
| 9,481,822 | B1 | | 11/2016 | Jiang | |
| 9,528,042 | B1 | | 12/2016 | Jiang | |
| 2011/0059871 | A1 | | 3/2011 | Tour et al. | |

FOREIGN PATENT DOCUMENTS

| CN | 102015958 A | 4/2011 |
|---|---|---|
| CN | 102199417 A | 9/2011 |
| CN | 103980869 A | 8/2014 |
| CN | 104531106 A | 4/2015 |
| CN | 104893691 A | 9/2015 |
| CN | 105441038 A | 3/2016 |
| CN | 105623626 A | 6/2016 |
| CN | 105647489 A | 6/2016 |
| WO | 2015147852 A1 | 10/2015 |

OTHER PUBLICATIONS

First Office Action from Chinese Application No. 201610381991.1 dated Feb. 4, 2017.
First Office Action from Chinese Application No. 201610380561.8 dated Mar. 3, 2017.

* cited by examiner

*Primary Examiner* — Aiqun Li
(74) *Attorney, Agent, or Firm* — Calfee Halter & Griswold LLP

(57) ABSTRACT

The present invention relates to the well drilling field in petroleum industry, in particular to an additive composition suitable for viscosity reduction of oil-based drilling fluids, an oil-based drilling fluid and use thereof. The double-block copolymer mainly consists of a block A and a block B, wherein, the block A is composed of structural units represented by formula (1), the block B is composed of structural units represented by formula (2), and the number-average molecular weight of the block A is 1,500-10,000. The double-block copolymer provided in the present invention can be used as a viscosity reducer in oil-based drilling fluids, especially can be used as a viscosity reducer in high-density clay-free oil-based drilling fluids, and can greatly decrease the apparent viscosity and plastic viscosity of oil-based drilling fluids in high-temperature and high-pressure reservoir while maintaining appropriate shearing force, so as to increase the drilling rate and reduce drilling difficulties.

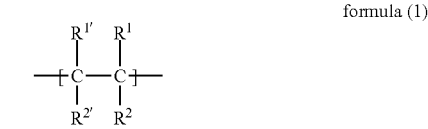

formula (1)

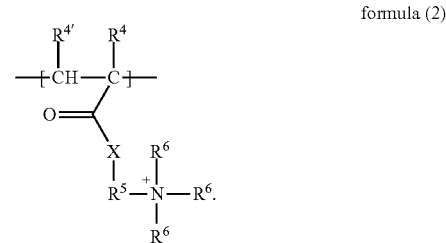

formula (2)

15 Claims, No Drawings

ADDITIVE COMPOSITION SUITABLE FOR VISCOSITY REDUCTION OF OIL-BASED DRILLING FLUID, OIL-BASED DRILLING FLUID AND USE THEREOF

CROSS REFERENCE TO RELATED APPLICATIONS

The present invention claims priority to Chinese Application No. 201610726964.3, filed on Aug. 25, 2016, entitled "Additive Composition Suitable for Viscosity Reduction of Oil-Based Drilling Fluid and Use Thereof, and Oil-Based Drilling Fluid and Use Thereof", which is specifically and entirely incorporated by reference.

FIELD OF THE INVENTION

The present invention relates to the well drilling field in petroleum industry, in particular to an additive composition suitable for viscosity reduction of oil-based drilling fluids, an oil-based drilling fluid and a use of the oil-based drilling fluid.

BACKGROUND OF THE INVENTION

As the exploration scope is enlarged and the exploration depth is increased, drilling in high-temperature and high-pressure reservoir has become a normal state of oil and gas drilling operation. High temperature and high pressure means high risk and high cost, and higher requirements for drilling operation, equipment, and drilling fluid properties.

There are high requirements for the temperature resistance property and density of the drilling fluid used for drilling in high-temperature and high-pressure reservoir. To ensure the temperature resistance property of drilling fluid, usually oil-based drilling fluids, which have an excellent temperature resistance property, are selected for drilling operation in high-temperature and high-pressure wells. However, even an oil-based drilling fluid that has excellent performance is used, the solid content in the system will increase inevitably as the density increases; consequently, on one hand, the solid-solid and solid-liquid friction increases, resulting in increased plastic viscosity of the drilling fluid system; on the other hand, to keep the high solid content in suspension state preventing settlement, the shearing force of the drilling fluid system has to be increased by adding a rheological modifier, etc. However, rheological modifiers commonly used for drilling fluids at present may cause increased apparent viscosity and plastic viscosity of the drilling fluid system, though they can increase the shearing force of the drilling fluid system. Excessive apparent viscosity and plastic viscosity may result in: (1) decreased drilling rate and longer drilling cycle; (2) increased circulation loss and increase drilling pump load; (3) increased equivalent circulation density, and complex downhole conditions such as lost circulation, pressure differential sticking, etc.; ultimately the cost and difficulty of drilling operation are increased.

Therefore, for high-density drilling fluids, usually a viscosity reducer is added, in order to greatly decrease the apparent viscosity and plastic viscosity of the system while maintaining appropriate shearing force, increase drilling rate, reduce drilling difficulties, save drilling cost, prevent downhole accidents, and ensure safe and efficient drilling operation.

At present, viscosity reducers for water-based drilling fluids are available in great varieties and widely applied, while the researches on viscosity reducers for oil-based drilling fluids and relevant products are rare, because oil-based drilling fluids are recognized for long as having characteristics including good rheological property, low viscosity, and easy control, etc. However, as the requirements for the temperature resistance property and density of drilling fluids in high-temperature and high-pressure wells become higher and higher, the apparent viscosity and plastic viscosity of oil-based drilling fluids (even clay-free oil-based drilling fluids) will go far beyond a reasonable range and will be difficult to control if the density of the oil-based drilling fluid is 2 g/cm$^3$ or higher; in addition, usually the applicable temperature doesn't exceed 150° C.

SUMMARY OF THE INVENTION

The object of the present invention is to provide an additive composition suitable for viscosity reduction of oil-based drilling fluids, especially suitable for viscosity reduction of high-density oil-based drilling fluids, an oil-based drilling fluid, and a use of the oil-based drilling fluid.

To attain the object described above, the present invention provides a drilling fluid additive composition comprising a viscosity reducer, an emulsifier, and a rheological modifier, wherein:

the viscosity reducer is a double-block copolymer mainly consisting of a block A and a block B, wherein, the block A is composed of structural units represented by formula (1), the block B is composed of structural units represented by formula (2), and the number-average molecular weight of the block A is 1,500-10,000,

formula (1)

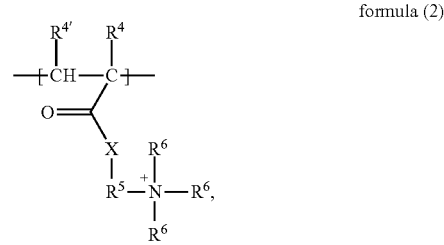

formula (2)

wherein, $R^1$, $R^{1'}$, $R^4$, $R^{4'}$, and $R^6$ are independently selected from H and C1-C6 alkyl; $R^2$ and $R^{2'}$ are independently selected from H, C1-C6 alkyl, —O—C(O)—$R^3$ and —COOR$^3$, and at least one of $R^2$ and $R^{2'}$ is selected from —O—C(O)—$R^3$ or —COOR$^3$, and $R^3$ is selected from C1-C6 alkyl; $R^5$ is selected from C1-C8 alkylene; X is selected from —NH— or —O—;

the emulsifier is one or more of compounds represented by formula (I);

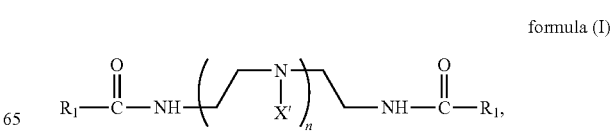

formula (I)

in the formula (I), each of the two R1 groups is independently selected from C14-C30 alkyl optionally substituted by group Y and C14-C30 unsaturated alkyl with carbon-carbon double bonds optionally substituted by group Y, and the group Y is independently selected from the groups represented by the following formulae:

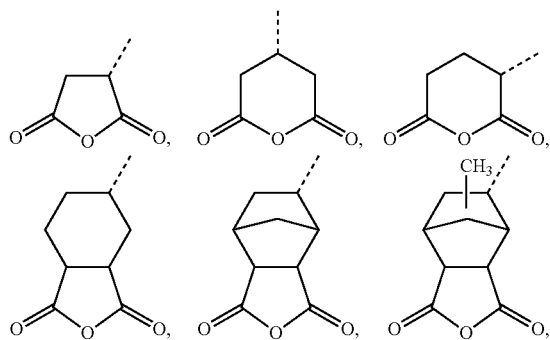

n is an integer in a range of 1-8;

n X'-es are independently selected from H and —C(O)—$R_2$, and at least one X' is —C(O)—$R_2$, $R_2$ is selected from carboxyl, C1-C6 alkyl, C3-C8 cycloalkyl, C1-C6 alkyl substituted by carboxyl, C3-C8 cycloalkyl substituted by carboxyl, C3-C8 cycloalkyl substituted by carboxyl and C1-C4 alkyl, C2-C6 unsaturated alkyl with a carbon-carbon double bond, C3-C8 unsaturated cycloalkyl with a carbon-carbon double bond, C2-C6 unsaturated alkyl with a carbon-carbon double bond substituted by carboxyl, and C3-C8 unsaturated cycloalkyl with a carbon-carbon double bond substituted by carboxyl and C1-C4 alkyl;

the rheological modifier is a dimer acid-organic amine copolymer comprising structural units from dimer acid, structural units from alkylamine and structural units from arylamine, of which the dimer acid is a dimer of oleic acid and linoleic acid, the alkylamine is one or more of C10-C20 alkyl primary amines, and the arylamine is one or more of aniline and aniline substituted by C1-C3 alkyl at one or more sites on benzene ring.

The present invention further provides an oil-based drilling fluid containing the composition described above.

The present invention further provides a use of the oil-based drilling fluid in oil and gas drilling.

By virtue of a synergistic effect among the active constituents, including viscosity reducer, emulsifier and rheological modifier, the composition provided in the present invention can greatly decrease the apparent viscosity and plastic viscosity of an oil-based drilling fluid while maintaining appropriate shearing force, when it is used as an additive in the oil-based drilling fluid, especially in a high-density clay-free oil-based drilling fluid, so as to increase the drilling rate, reduce drilling difficulties, save drilling cost, prevent downhole accidents, and ensure safe and efficient drilling operation. Especially, the composition provided in the present invention can withstand high temperature up to 200° C. or above, and is suitable for high-density oil-based drilling fluids with 2 g/cm³ or higher density.

Other features and advantages of the present invention will be further detailed in the embodiments hereunder.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The ends points and any value in the ranges disclosed in the present invention are not limited to the exact ranges or values. Instead, those ranges or values shall be comprehended as encompassing values that are close to those ranges or values. For numeric ranges, the end points of the ranges, the end points of the ranges and the discrete point values, and the discrete point values can be combined to obtain one or more new numeric ranges, which shall be deemed as having been disclosed specifically in this document.

The present invention provides a drilling fluid additive composition, which contains a viscosity reducer, an emulsifier, and a rheological modifier, wherein:

the viscosity reducer is a double-block copolymer mainly consisting of a block A and a block B, wherein, the block A is composed of structural units represented by formula (1), the block B is composed of structural units represented by formula (2), and the number-average molecular weight of the block A is 1,500-10,000,

formula (1)

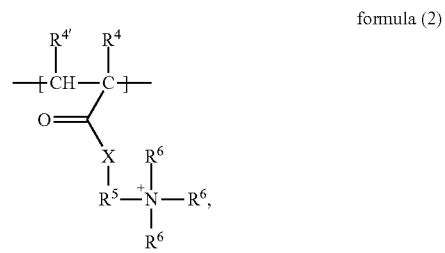

formula (2)

wherein, $R^1$, $R^{1'}$, $R^4$, $R^{4'}$, and $R^6$ are independently selected from H and C1-C6 alkyl; $R^2$ and $R^{2'}$ are independently selected from H, C1-C6 alkyl, —O—C(O)—$R^3$ and —COO$R^3$, and at least one of $R^2$ and $R^{2'}$ is selected from —O—C(O)—$R^3$ or —COO$R^3$, and $R^3$ is selected from C1-C6 alkyl; $R^5$ is selected from C1-C8 alkylene; X is selected from —NH— or —O—;

the emulsifier is one or more of compounds represented by formula (I);

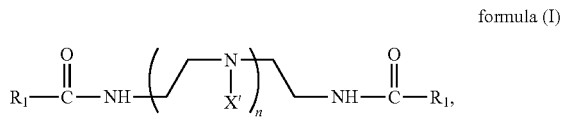

formula (I)

in the formula (I), each of the two $R_1$ groups is independently selected from C14-C30 alkyl optionally substituted by group Y and C14-C30 unsaturated alkyl with carbon-carbon double bonds optionally substituted by group Y, and the group Y is independently selected from the groups represented by the following formulae:

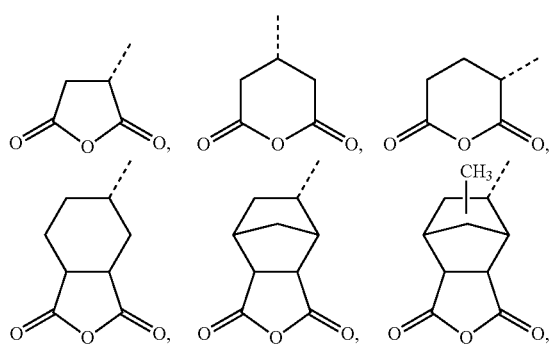

n is an integer in a range of 1-8;

n X'-es are independently selected from H and —C(O)—$R_2$, and at least one X' is —C(O)—$R_2$, $R_2$ is selected from carboxyl, C1-C6 alkyl, C3-C8 cycloalkyl, C1-C6 alkyl substituted by carboxyl, C3-C8 cycloalkyl substituted by carboxyl, C3-C8 cycloalkyl substituted by carboxyl and C1-C4 alkyl, C2-C6 unsaturated alkyl with a carbon-carbon double bond, C3-C8 unsaturated cycloalkyl with a carbon-carbon double bond, C2-C6 unsaturated alkyl with a carbon-carbon double bond substituted by carboxyl, and C3-C8 unsaturated cycloalkyl with a carbon-carbon double bond substituted by carboxyl and C1-C4 alkyl;

the rheological modifier is a dimer acid-organic amine copolymer comprising structural units from dimer acid, structural units from alkylamine and structural units from arylamine, of which the dimer acid is a dimer of oleic acid and linoleic acid, the alkylamine is one or more of C10-C20 alkyl primary amines, and the arylamine is one or more of aniline and aniline substituted by C1-C3 alkyl at one or more sites on benzene ring.

According to the present invention, in order to give a better play to the synergistic effect among the active constituents in the composition, preferably, the weight ratio of the viscosity reducer to the emulsifier to the rheological modifier is 100:100-500:100-500, and more preferably is 100:200-400:100-300.

According to the present invention, the double-block copolymer that serves as a viscosity reducer mainly consists of a block A and a block B, i.e., the double blocks in the double-block copolymer refer to block A and block B here; thus, the double-block copolymer may be deemed as a double-block linear copolymer consisting of the block A and the block B, and may be expressed as A-B; however, there is no particular restriction on the terminal groups of the block A and block B; namely, the terminal groups may be a variety of groups that don't hinder the double-block copolymer from serving as a viscosity reducer, and usually are H. In the double-block copolymer provided in the present invention, the block A is a non-polar long-chain polymeric block that can stretch in oil, and the block B is an amino long-chain polymeric block that contains positive charges. When the composition provided in the present invention is applied as an additive in an oil-based drilling fluid, the amino long-chain polymeric block that contains positive charge in the viscosity reducer can be absorbed preferentially to the surfaces of barite particles or the like by means of electrostatic interaction, break up the overlapped and agglomerated barite particles or the like; thus, the charged particles are more easily to disperse homogeneously owing to the high repulsive forces among the charged particles, and thereby the viscosity of the system can be decreased; at the same time, the oil-soluble long-chain block A stretches in the oil, so that the solubility of the polymer in the oil is increased, the steric hindrance is increased, and the contact among the particles and between the particles and the liquid phase is reduced; in addition, when the drilling fluid that contains the composition provided in the present invention flows, the particles are in elastic contact with each other owing to the protection of the double-block copolymer provided in the present invention; thus, the internal friction is reduced, and the plastic viscosity is decreased. Hence, working with other active constituents, the composition provided in the present invention can greatly decrease the apparent viscosity and plastic viscosity of the oil-based drilling fluid while maintaining appropriate shearing force, so as to increase drilling rate, decrease drilling difficulties, save drilling cost, prevent downhole accidents, and ensure safe and efficient drilling operation.

According to the present invention, wherein, the C1-C6 alkyl may be methyl, ethyl, n-propyl, isopropyl, n-butyl, isobutyl, sec-butyl, tert-butyl, n-pentyl, isopentyl, n-hexyl, etc., for example. The C1-C8 alkylene may be alkylene formed by the above-mentioned C1-C6 alkyl, or heptylene or octylene, for example. To give a better play to the effect of the double-block copolymer serving as a viscosity reducer, preferably, $R^1$, $R^{1'}$, $R^4$, $R^{4'}$ and $R^6$ are independently selected from H and C1-C4 alkyl; $R^2$ and $R^{2'}$ are independently selected from H, C1-C4 alkyl, —O—C(O)—$R^3$ and —COO$R^3$, and at least one of $R^2$ and $R^{2'}$ is selected from —O—C(O)—$R^3$ or —COO$R^3$, and $R^3$ is selected from C1-C4 alkyl; $R^5$ is selected from C1-C6 alkylene. More preferably, $R^1$, $R^{1'}$, $R_4$, $R^{4'}$ and $R^6$ are independently selected from H, methyl, ethyl, n-propyl, isopropyl, n-butyl, —O—C(O)—$CH_3$, —O—C(O)—$CH_2CH_3$, —O—C(O)—$CH_2CH_2CH_3$, —O—C(O)—CH($CH_3$)$CH_3$, —COOC$H_3$, —COOC$H_2$C$H_3$, —COOC$H_2$C$H_2$C$H_3$ and —COOCH($CH_3$)$CH_3$, and at least one of $R^2$ and $R^{2'}$ is selected from —O—C(O)—$CH_3$, —O—C(O)—$CH_2CH_3$, —O—C(O)—$CH_2CH_2CH_3$, —O—C(O)—CH($CH_3$)$CH_3$, —COOC$H_3$, —COOC$H_2$C$H_3$, —COOC$H_2$C$H_2$C$H_3$ or —COOCH($CH_3$)$CH_3$; $R^5$ is selected from —$CH_2$—, —$CH_2$—$CH_2$—, —$CH_2$—$CH_2$—$CH_2$—, —CH($CH_3$)—$CH_2$—, —$CH_2$—CH($CH_3$)—, —$CH_2$—($CH_2$)$_2$—$CH_2$—, —$CH_2$—CH($CH_3$)—$CH_2$—, —C($CH_3$)$_2$—$CH_2$—, —$CH_2$—C($CH_3$)$_2$—, —$CH_2$—($CH_2$)$_3$—$CH_2$— or —$CH_2$—($CH_2$)$_4$—$CH_2$—.

In a preferred embodiment of the present invention, $R^{1'}$ is H, and $R^1$ is methyl. In another preferred embodiment of the present invention, le and $R^{1'}$ are H. In another preferred embodiment of the present invention, $R^{2'}$ is H, and $R^2$ is selected from —O—C(O)—$CH_3$, —O—C(O)—$CH_2CH_3$, —O—C(O)—$CH_2CH_2CH_3$, —O—C(O)—CH($CH_3$)$CH_3$, —COOC$H_3$, —COOC$H_2$C$H_3$, —COOC$H_2$C$H_2$C$H_3$ or —COOCH($CH_3$)$CH_3$. In another preferred embodiment of the present invention, $R^{2'}$ and $R^2$ are independently selected from —O—C(O)—$CH_3$, —O—C(O)—$CH_2CH_3$, —O—C(O)—$CH_2CH_2CH_3$, —O—C(O)—CH($CH_3$)$CH_3$, —COOC$H_3$, —COOC$H_2$C$H_3$, —COOC$H_2$C$H_2$C$H_3$ and —COOCH($CH_3$)$CH_3$.

According to the present invention, it should be appreciated that the structural units represented by the formula (2) may contain an anion part. There is no particular restriction on the anion part in the present invention, as long as the anion part doesn't affect the properties of the drilling fluid. For example, the anions may be F⁻, Cl⁻, Br⁻, and I⁻, etc.

According to the present invention, to obtain a double-block copolymer that has better viscosity reduction property while maintaining appropriate shearing force, the number-average molecular weight of the block A preferably is 1,500-9,000, more preferably is 2,000-8,000, even more preferably is 2,500-6,000, still more preferably is 3,500-5,500. For example, the molecular weight distribution coefficient of the block A may be 1-1.5, and preferably is 1-1.3.

According to the present invention, the content of the structural units represented by the formula (1) and the content of the structural units represented by the formula (2) in the double-block copolymer may vary in a wide range respectively; however, to ensure that the block A and block B that are formed by the structural units represented by the formula (1) and the structural units represented by the formula (2) respectively can cooperate with each other in a better way and give full play to the synergetic effect between them and other active constituents in the composition so as to decrease the viscosity of the drilling fluid as far as possible, preferably, the molar ratio of the content of the structural units represented by the formula (1) to the content of the structural units represented by the formula (2) is 1:0.2-5, more preferably is 1:0.5-2, even more preferably is 1:0.6-1.6, and may be 1:0.8-1.5, for example. On the basis of the above-mentioned condition and the above-mentioned molecular weight of the block A, the number-average molecular weight of the double-block copolymer provided in the present invention preferably is 5,000-25,000, more preferably is 6,000-24,000, even more preferably is 8,000-20,000, still more preferably is 8,500-16,000, and may be 10,000-15,000, for example.

According to the present invention, though not specified particularly, in the double-block copolymer provided in the present invention, it should be deemed that the block A is composed of one or more of the structural units represented by the formula (1), and the block B is composed of one or more of the structural units represented by the formula (2).

Preferably, the method for preparation of the double-block copolymer in the present invention comprises:

(1) in the presence of a chain-transfer agent and a first azo initiator, subjecting the compound represented by formula (1') to have a polymerization reaction in a first organic solvent, to obtain a polymer A with number-average molecular weight equal to 2000-10,000; (2) in the presence of a second azo initiator, subjecting the polymer A and a compound represented by formula (2') to have a copolymerization reaction in a second organic solvent;

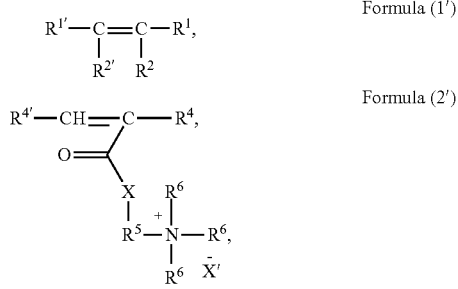

wherein, $R^1$, $R^{1'}$, $R^4$, $R^{4'}$, and $R^6$ are independently selected from H and C1-C6 alkyl; $R^2$ and $R^{2'}$ are independently selected from H, C1-C6 alkyl, —O—C(O)—$R^3$ and —COO$R^3$, and at least one of $R^2$ and $R^{2'}$ is selected from —O—C(O)—$R^3$ or —COO$R^3$, and $R^3$ is selected from C1-C6 alkyl; $R^5$ is selected from C1-C8 alkylene; X is selected from —NH— or —O—; X' is selected from halogens. In the present invention, the halogens may be F, Cl, Br, I, etc., for example. X' is preferably selected from F, Cl or Br.

Wherein, the substituents involved in the monomers in the above-mentioned method are those described above, and will not be detailed anymore here. Alternatively, the compound represented by the formula (1') and the compound represented by the formula (2') may be selected properly according to the specific structural units of the copolymer described above.

Wherein, the examples of the compound represented by the formula (1') may be one or more of compounds represented by the following formula:

formula (1'-1): in the formula (1'), $R^1$ and $R^{1'}$ are H, $R^{2'}$ is H, $R^2$ is —COOCH$_3$ (also referred to as methyl acrylate);

formula (1'-2): in the formula (1'), $R^1$ and $R^{1'}$ are H, $R^{2'}$ is H, $R^2$ is —COOCH$_2$CH$_3$ (also referred to as ethyl acrylate);

formula (1'-3): in the formula (1'), $R^1$ is methyl, $R^{1'}$ is H, $R^{2'}$ is H, $R^2$ is —COOCH$_3$ (also referred to as methyl methacrylate);

formula (1'-4): in the formula (1'), $R^1$ is methyl, $R^{1'}$ is H, $R^{2'}$ is H, $R^2$ is —COOCH$_2$CH$_3$ (also referred to as ethyl methacrylate);

formula (1'-5): in the formula (1'), $R^1$ and $R^{1'}$ are H, $R^{2'}$ and $R^2$ are —COOCH$_3$ (also referred to as dimethyl maleate);

in the formula (1'-6): in the formula (1'), $R^1$ and $R^{1'}$ are H, $R^{2'}$ and $R^2$ are —COOCH$_2$CH$_3$ (also referred to as diethyl maleate);

formula (1'-7): in the formula (1'), $R^1$ and $R^{1'}$ are H, $R^{2'}$ is H, $R^2$ is —O—C(O)—CH$_3$ (also referred to as vinyl acetate);

formula (1'-8): in the formula (1'), $R^1$ and $R^{1'}$ are H, $R^{2'}$ is H, $R^2$ is —O—C(O)—CH$_2$CH$_3$ (also referred to as vinyl propionate).

Wherein, the examples of the compound represented by the formula (2') may be one or more of compounds represented by the following formula:

formula (2'-1): in the formula (2'), $R^4$ and $R^{4'}$ are H, X is selected from —O—, $R^5$ is selected from —CH$_2$—CH$_2$—, $R^6$ is selected from methyl, X' is selected from Cl (also referred to as (2-acryloyloxyethyl)trimethylammonium chloride);

formula (2'-2): in the formula (2'), $R^4$ is methyl, $R^{4'}$ is H, X is selected from —O—, $R^5$ is selected from —CH$_2$—CH$_2$—, $R^6$ is selected from methyl, X' is selected from Cl (also referred to as (2-methacryloyloxyethyl)trimethylammonium chloride);

formula (2'-3): in the formula (2'), $R^4$ and $R^{4'}$ are H, X is selected from —O—, $R^5$ is selected from —CH$_2$—CH$_2$—CH$_2$—, $R^6$ is selected from methyl, X' is selected from Cl (also referred to as (3-acryloyloxypropyl)trimethylammonium chloride);

formula (2'-4): in the formula (2'), $R^4$ is methyl, $R^{4'}$ is H, X is selected from —O—, $R^5$ is selected from —CH$_2$—CH$_2$—CH$_2$—, $R^6$ is selected from methyl, X' is selected from Cl (also referred to as (3-methacryloyloxypropyl)trimethylammonium chloride);

formula (2'-5): in the formula (2'), $R^4$ and $R^{4'}$ are H, X is selected from —O—, $R^5$ is selected from —CH$_2$—(CH$_2$)$_2$—CH$_2$—, $R^6$ is selected from methyl, X' is selected from Cl (also referred to as (4-acryloyloxybutyl)trimethylammonium chloride);

formula (2'-6): in the formula (2'), $R^4$ is methyl, $R^{4'}$ is H, X is selected from —O—, $R^5$ is selected from —CH$_2$—

$(CH_2)_2$—$CH_2$—, $R^6$ is selected from methyl, X' is selected from Cl (also referred to as (4-methacryloyloxybutyl)trimethylammonium chloride);

formula (2'-7): in the formula (2'), $R^4$ and $R^{4'}$ are H, X is selected from —NH—, $R^5$ is selected from —$CH_2$—$CH_2$—, $R^6$ is selected from methyl, X' is selected from Cl (also referred to as (2-acrylamidoethyl)trimethylammonium chloride);

formula (2'-8): in the formula (2'), $R^4$ is methyl, $R^{4'}$ is H, X is selected from —NH—, $R^5$ is selected from —$CH_2$—$CH_2$—, $R^6$ is selected from methyl, X' is selected from Cl (also referred to as (2-methacrylamidoethyl)trimethylammonium chloride);

formula (2'-9): in the formula (2'), $R^4$ and $R^{4'}$ are H, X is selected from —NH—, $R^5$ is selected from —$CH_2$—$CH_2$—$CH_2$—, $R^6$ is selected from methyl, X' is selected from Cl (also referred to as (3-acrylamidopropyl)trimethylammonium chloride);

formula (2'-10): in the formula (2'), $R^4$ is methyl, $R^{4'}$ is H, X is selected from —NH—, $R^5$ is selected from —$CH_2$—$CH_2$—$CH_2$—, $R^6$ is selected from methyl, X' is selected from Cl (also referred to as (3-methacrylamidopropyl)trimethylammonium chloride);

formula (2'-11): in the formula (2'), $R^4$ and $R^{4'}$ are H, X is selected from —NH—, $R^5$ is selected from —$CH_2$—$(CH_2)_2$—$CH_2$—, $R^6$ is selected from methyl, X' is selected from Cl (also referred to as (4-acrylamidobutyl)trimethylammonium chloride);

formula (2'-12): in the formula (2'), $R^4$ is methyl, $R^{4'}$ is H, X is selected from —NH—, $R^5$ is selected from —$CH_2$—$(CH_2)_2$—$CH_2$—, $R^6$ is selected from methyl, X' is selected from Cl (also referred to as (4-methacrylamidobutyl)trimethylammonium chloride).

According to the present invention, to obtain a double-block copolymer that has better viscosity reduction property while maintaining appropriate shearing force, the number-average molecular weight of the polymer A obtained in the step (1) preferably is 1,500-9,000, more preferably is 2,000-8,000, even more preferably is 2,500-6,000, still more preferably is 3,500-5,500. The amounts of the monomers may be selected according to the molar ratio and the molecular weights of the structural units in the required copolymer; however, preferably, in the step (2), the molar ratio of the compound represented by the formula (1') that constitute the polymer A and the compound represented by the formula (2') is 1:0.2-5, more preferably is 1:0.5-2, even more preferably is 1:0.6-1.6, and may be 1:0.8-1.5, for example. Here, the compound represented by the formula (1') that is a constituent of the polymer A should be comprehended as the part of polymer A that participates in the copolymerization reaction with the compound represented by the formula (2') in the step (2), and the amount should be comprehended as the amount of the compound represented by the formula (1') required for preparing the part of polymer A.

To facilitate the polymerization reaction and reasonably control the molecular weight of the obtained copolymer, preferably, in the step (1), based on 1 mol of compound represented by the formula (1'), the amount of the first organic solvent is 200-600 mL, and more preferably is 200-400 mL. The first organic solvent may be any conventional organic solvent that can form the polymer A but doesn't hinder successful execution of the reaction in the art, and preferably is one or more of benzene, methylbenzene, ethylbenzene, dimethylbenzene, 1,4-dioxane, ethanol and isopropanol.

According to the present invention, the chain-transfer agent may be any conventional chain-transfer agent in the art; however, to obtain more appropriate molecular weight, preferably, the chain-transfer agent is one or more of 2-(dodecylsulfanylthiocarbonylsulfanyl)-2-methylpropionic acid, 3-benzylsulfanylthiocarbonylsufanylpropionic acid, 4-cyanopentanoic acid dithiobenzoate, and cumyl dithiobenzoate. The amount of the chain-transfer agent may vary within a wide range; preferably, based on 1 mol of the compound represented by the formula (1'), the amount of the chain-transfer agent is 15-55 mmol, more preferably is 20-50 mmol, even more preferably is 24-35 mmol, and may be 25-30 mmol, for example. It should be appreciated that the chain-transfer agent will be retained with the polymer A, and can participate in the copolymerization reaction in the step (2). It is deemed that the polymer A in the step (1) of the method is a mixture of the polymer formed by the compound represented by the formula (1') and the chain-transfer agent, etc. That is common knowledge on polymers in the art, without any limit in the present invention unless indicated.

According to the present invention, the first azo initiator may be any conventional azo initiator in the art; preferably, the first azo initiator is one or more of 4,4'-azobis(4-cyanovaleric acid), 2,2'-azobis[2-methylpropionamidine]dihydrochloride, 2,2'-azobis(2-methylpropionitrile), 2,2'-azobisisoheptonitrile, and 2,2'-azobis[2-(2-imidazolin-2-yl)propane]dihydrochloride. Such an azo initiator can work with the chain-transfer agent to form a reaction system required for RAFT polymerization, so that the polymerization reaction and copolymerization reaction in the present invention can happen in a controlled manner to obtain the double-block copolymer. The amount of the first azo initiator may vary within a wide range; however, preferably, based on 1 mol of the compound represented by the formula (1'), the amount of the first azo initiator is 8-25 mmol, more preferably is 8-20 mmol, even more preferably is 9.5-17 mmol, such as 10-14 mmol.

According to the present invention, preferably, the conditions of the polymerization reaction in the step (1) include: temperature of 50-80° C. (preferably 55-70° C.), time of 2-6 h (preferably 3-5 h).

According to the present invention, to maintain the activity of the initiator, etc., the step (1) may further comprise: subjecting the polymerization reaction to happen in an inert atmosphere; for example, one or more of nitrogen, helium, neon, argon and the like may be charged into the system to displace the atmosphere in the system (for example, that process may be executed for 5-300 min., mainly for removing oxygen).

According to the present invention, to extract the polymer A, the step (1) may further comprises: treating the product of the polymerization reaction by reduced pressure distillation to remove the unreacted monomers and the solvent and thereby obtain required polymer A.

According to the present invention, in the step (2), by further initiating with a second azo initiator, the compound represented by the formula (2') is initiated to have a copolymerization reaction at an active terminal of the polymer A, so as to obtain the double-block copolymer required in the present invention.

According to the present invention, to facilitate the polymerization reaction and reasonably control the molecular weight of the obtained copolymer, preferably, in the step (2), based on 1 mol of the compound represented by the formula (2'), the amount of the second organic solvent is 400-1,200 mL, and more preferably is 440-800 mL. The second organic solvent may be any conventional organic solvent that can form the double-block copolymer but doesn't hinder successful execution of the reaction; preferably, the second organic solvent is one or more of DMF, THF, methylene chloride, chloroform and carbon tetrachloride.

According to the present invention, the second azo initiator may be any conventional azo initiator in the art; preferably, the second azo initiator may be one or more of 4,4'-azobis(4-cyanovaleric acid), 2,2'-azobis[2-methylpropionamidine]dihydrochloride, 2,2'-azobis(2-methylpropionitrile), 2,2'-azobisisoheptonitrile, and 2,2'-azobis[2-(2-imidazolin-2-yl)propane]dihydrochloride. Such an azo initiator has the characteristics required in the present invention as described above. The amount of the second azo initiator may vary within a wide range; however, preferably, based on 1 mol of the compound represented by the formula (2'), the amount of the second azo initiator is 3-10 mmol, more preferably is 3-6 mmol.

According to the present invention, preferably, the conditions of the copolymerization reaction in the step (2) include: temperature of 80-140° C. (preferably 100-120° C.), time of 12-36 h (preferably 18-24 h).

According to the present invention, to maintain the activity of the initiator, etc., the step (2) may further comprises: controlling the copolymerization reaction to happen in an inert atmosphere; for example, one or more of nitrogen, helium, neon, argon and the like may be charged into the system to displace the atmosphere in the system (for example, that process may be executed for 5-300 min., mainly for removing oxygen).

According to the present invention, to extract the double-block copolymer, the method may further comprise: mixing the product of the copolymerization reaction with methanol and making the product precipitate, and filtering, washing, and drying the precipitate, so as to obtain the double-block copolymer in the present invention.

The double-block copolymer prepared with the above-mentioned method in the present invention may be deemed as the double-block copolymer described above; however, it should be appreciated: the double-block copolymer prepared with the above-mentioned method may include copolymerized blocks that are slightly random at the two terminals, or in which the other terminal opposite to the block A terminal may include the structural unit represented by the formula (2) to some extent; however, the formation of such a copolymer is resulted from the polymerization in itself, and may be deemed as an allowable error in the art. Therefore, such a copolymer is also included in the scope of the present invention.

According to the present invention, the emulsifier is one or more of compounds represented by the following formula (I):

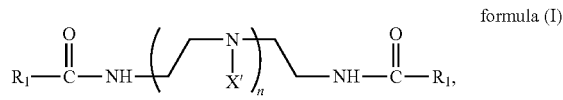

formula (I)

in the formula (I), each of the two $R_1$ groups is independently selected from C14-C30 alkyl optionally substituted by group Y and C14-C30 unsaturated alkyl with carbon-carbon double bonds optionally substituted by group Y, and the group Y is independently selected

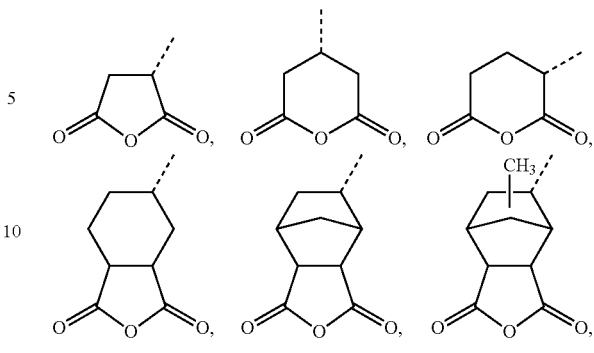

n is an integer in a range of 1-8; n X'-es are independently selected from H and —C(O)—$R_2$, and at least one X' is —C(O)—$R_2$, $R_2$ is selected from carboxyl, C1-C6 alkyl, C3-C8 cycloalkyl, C1-C6 alkyl substituted by carboxyl, C3-C8 cycloalkyl substituted by carboxyl, C3-C8 cycloalkyl substituted by carboxyl and C1-C4 alkyl, C2-C6 unsaturated alkyl with a carbon-carbon double bond, C3-C8 unsaturated cycloalkyl with a carbon-carbon double bond, C2-C6 unsaturated alkyl with a carbon-carbon double bond substituted by carboxyl, and C3-C8 unsaturated cycloalkyl with a carbon-carbon double bond substituted by carboxyl and C1-C4 alkyl.

According to the present invention, the emulsifier is one or more of compounds represented by the formula (I). The compounds represented by formula represented by the formula (I) are compounds with a comb-like structure containing a long saturated and/or unsaturated alkyl chains at two ends and short alkyl chains in the middle. Through increasing membrane strength of emulsification interface and with the help of the the rheological modifier and the lubricant obtained in the present invention, such compounds with a comb-like structure can stabilize drilling fluid and make the drilling fluid have appropriate gel strength and density, thereby obtaining suspending power, and realizing the object of raising temperature resistance of drilling fluid under this case.

Wherein, preferably, in the formula (I), each of the two $R_1$ groups is independently selected from C14-C20 alkyl optionally substituted by group Y and C14-C20 unsaturated alkyl with a carbon-carbon double bond optionally substituted by group Y (preferably with not more than 5 carbon-carbon double bonds, 1, 2 or 3 for example); n is an integer of 1-6; $R_2$ is selected from carboxyl, C1-C4 alkyl, C4-C6 cycloalkyl, C1-C4 alkyl substituted by carboxyl, C4-C6 cycloalkyl substituted by carboxyl, C4-C6 cycloalkyl substituted by carboxyl and methyl, C2-C4 unsaturated alkyl with a carbon-carbon double bond (preferably with 1-3 carbon-carbon double bonds, 1, 2 or 3 for example), C4-C6 unsaturated cycloalkyl with a carbon-carbon double bond (preferably with not more than 5 carbon-carbon double bonds, 1, 2 or 3 for example), C2-C4 unsaturated alkyl with a carbon-carbon double bond substituted by carboxyl (preferably with 1-3 carbon-carbon double bonds, 1, 2 or 3 for example), and C4-C7 unsaturated cycloalkyl with a carbon-carbon double bond substituted by carboxyl and methyl (preferably with not more than 5 carbon-carbon double bonds, 1, 2 or 3 for example).

More preferably, in Formula (I), each of the two $R_1$ groups is independently selected from C15-C18 alkyl optionally substituted by group Y and C15-C18 unsaturated alkyl with a carbon-carbon double bond optionally substituted by group Y; n is an integer of 1-4, for example 1, 2, 3 or 4.

According to the present invention, each of the two $R_1$ groups can be selected respectively and independently, and the two $R_1$ groups may be the same or different from each other, wherein, examples of the $R_1$ group may include the following groups: $-(CH_2)_7-CH=CH-(CH_2)_7-CH_3$, $-(CH_2)_8-CH(Y)-(CH_2)_7-CH_3$, $-(CH_2)_7-CH(Y)-(CH_2)_8-CH_3$, $-(CH_2)_7-CH(Y)-CH(Y)-(CH_2)_7-CH_3$, $-(CH_2)_{16}-CH_3$, $-(CH_2)_7-CH=CH-CH_2-CH=CH-(CH_2)_4-CH_3$, $-(CH_2)_7-CH=CH-CH_2-CH(Y)-(CH_2)_4-CH_3$, $-(CH_2)_7-CH=CH-CH_2-CH(Y)-(CH_2)_5-CH_3$, $-(CH_2)_8-CH(Y)-CH_2-CH=CH-(CH_2)_4-CH_3$, $-(CH_2)_7-CH(Y)-CH_2-CH=CH-(CH_2)_4-CH_3$, $-(CH_2)_7-CH=CH-CH_2-CH(Y)-CH(Y)-(CH_2)_4-CH_3$, $-(CH_2)_7-CH(Y)-CH(Y)-CH_2-CH=CH-(CH_2)_4-CH_3$, $-(CH_2)_7-CH(Y)-CH(Y)-CH_2-CH(Y)-(CH_2)_5-CH_3$, $-(CH_2)_8-CH(Y)-CH_2-CH(Y)-CH(Y)-(CH_2)_4-CH_3$, $-(CH_2)_7-CH(Y)-CH_2-CH_2-CH(Y)-CH(Y)-(CH_2)_4-CH_3$, $-(CH_2)_7-CH(Y)-CH(Y)-CH_2-CH_2-CH(Y)-(CH_2)_4-CH_3$, $-(CH_2)_7-CH(Y)-CH(Y)-CH_2-CH(Y)-CH(Y)-(CH_2)_4-CH_3$, $-(CH_2)_{14}-CH_3$, $-(CH_2)_{13}-CH_3$, where group Y, as described above, is selected from

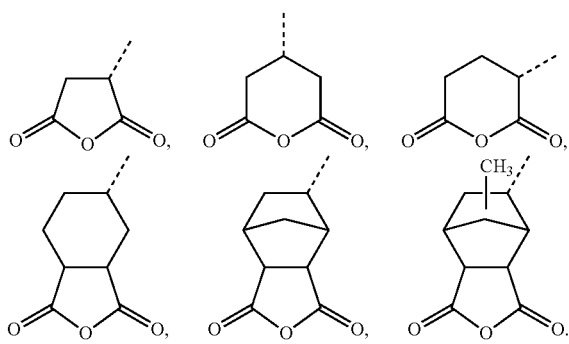

The connecting dotted lines on these groups stand for linkage sites linking the carbon atoms on $R_1$.

According to the present invention, examples of the group $R_2$ may include: carboxyl, methyl, ethyl, propyl, cyclopentyl, cyclohexyl, $-CH_2-COOH$ (referring to C1 alkyl substituted by a carboxyl group), $-(CH_2)_2-COOH$ (referring to C2 alkyl substituted by a carboxyl group), $-CH(CH_2-COOH)_2$ (referring to C3 alkyl substituted by two carboxyl groups),

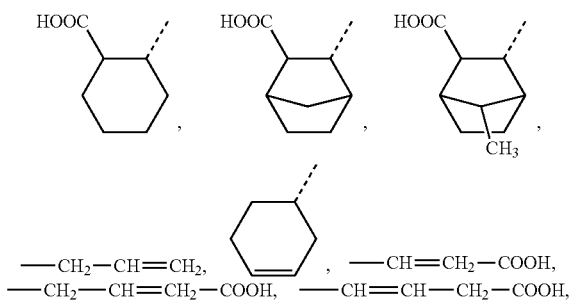

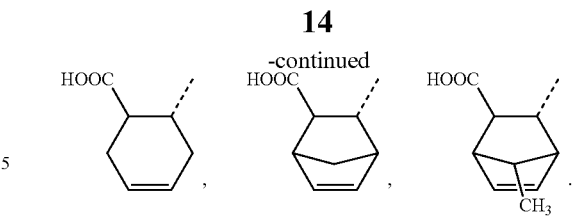

According to the present invention, the foregoing emulsifier may be a product available in the market and may also be prepared by a conventional method of the art. Preferably, the method for preparing the emulsifier comprises: subjecting a polyamine compound represented by Formula (II) to take amidation reaction with one or more of carboxylic acids represented by Formula $R_1-COOH$, and contacting and reacting the reaction product with one or more of carboxylic acids $R_2-COOH$ and anhydrides thereof;

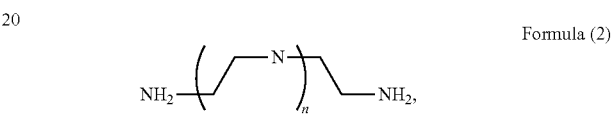

Formula (2)

where $R_2$ and n have been described above, so no necessary details will be given herein.

$R_1$, is selected from C14-C30 alkyl and C14-C30 unsaturated alkyl with a carbon-carbon double bond.

Wherein, examples of the carboxylic acid represented by formula $R_1-COOH$ may include: $COOH-(CH_2)_7-CH=CH-(CH_2)_7-CH_3$ (also referred to as oleic acid), $COOH-(CH_2)_7-CH=CH-CH_2-CH=CH-(CH_2)_4-CH_3$ (also referred to as linoleic acid), $COOH-(CH_2)_{16}-CH_3$ (also referred to as octadecanoic acid), $COOH-(CH_2)_{14}-CH_3$ (also referred to as hexadecanoic acid or palmitic acid), and $COOH-(CH_2)_{13}-CH_3$ (also referred to as pentadecanoic acid).

Wherein, examples of the carboxylic acid represented by the formula $R_2-COOH$ and its anhydride may include: $HOOC-COOH$ (oxalic acid), $CH_3-COOH$ (acetic acid), $CH_3-COO-CO-CH_3$ (acetic anhydride), $HOOC-CH_2-COOH$ (propandioic acid), $HOOC-CH_2-CH_2-COOH$ (butanedioic acid), $HOOC-CH_2-CH(COOH)-CH_2-COOH$

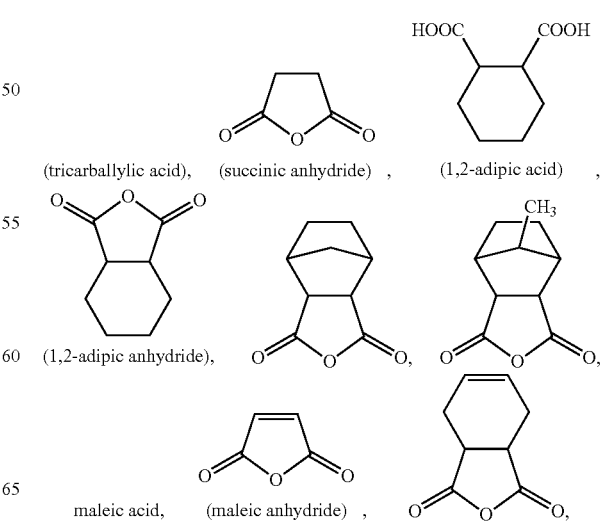

-continued

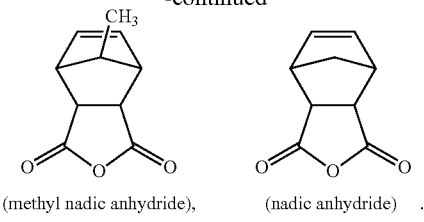

(methyl nadic anhydride),     (nadic anhydride)  .

According to the present invention, the embodiments of the polyamine represented by Formula (II) for example may include:

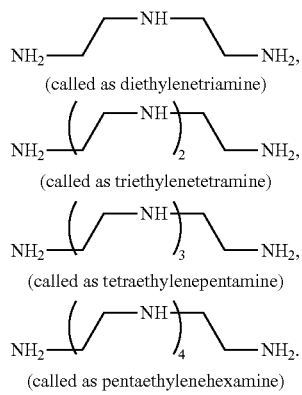

According to the present invention, the amidation reaction between the polyamine represented by foregoing Formula (II) and the carboxylic acid represented by $R_1$—COOH mainly refers to the amidation reaction between the primary amine of the polyamine represented by foregoing Formula (II) and the carboxylic group of the carboxylic acid represented by $R_1$—COOH, with water molecules removed to form amido bonds, thereby obtaining one or more of compounds with secondary amine not substituted in the middle of the chain as represented by Formula (I')

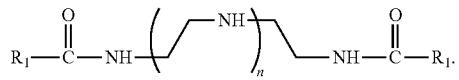

Preferably, the molar ratio of the polyamine compound represented by Formula (II) and the carboxylic acid represented by Formula $R_1$—COOH is 1:1.8 to 1:3, preferably 1:1.8 to 1:2.2.

According to the present invention, preferably, the conditions of the amidation reaction comprise: the temperature is a temperature of 220-230° C., pH value of 7-9 and a time of 3-5 h. In order to make amidation reaction more sufficient, this method may further comprise: firstly mixing the polyamine represented by Formula (II) with one or more of carboxylic acids represented by $R^{1'}$—COOH for 10-30 min under a stirring rate of 80-300 r/min, then taking the amidation reaction under a stirring rate of 80-300 r/min, and water is trapped by water knockout trap during amidation reaction.

According to the present invention, the emulsifier of the present invention may be obtained through contacting and reacting the above reaction product of the amidation reaction with one or more of the carboxylic acids represented by $R_2$—COOH and anhydrides thereof. The reaction product of amidation reaction may be purified to obtain the compound represented by

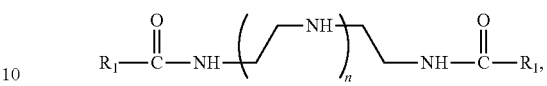

alternatively, the reaction product of amidation reaction without purification may directly contact and react with one or more of the carboxylic acids represented by $R_2$—COOH and anhydrides thereof so as to link —C(O)—$R_2$ substituent to the secondary amine between two amido bonds, thereby forming the compound with a comb-like structure represented by Formula (I). Preferably, the molar ratio of the polyamine compound represented by Formula (II) and the carboxylic acids represented by Formula $R_2$—COOH and anhydrides thereof is 1:0.5 to 1:20. For example, the molar ratio of the polyamine compound represented by Formula (II) and the carboxylic acids represented by Formula $R_2$—COOH and anhydrides thereof is 1:1.8 to 1:2.2, 1:3.6 to 1:4.4, 1:5.4 to 1:6.6, 1:7.2 to 1:8.8, 1:9 to 1:11, 1:10.8 to 1:13.2.

According to the present invention, when the carboxylic acid represented by $R_{1'}$—COOH is an unsaturated carboxylic acid with a carbon-carbon double bond, and the carboxylic acids represented by Formula $R_2$—COOH and anhydrides thereof adopted in the process of the contract reaction also contain a carbon-carbon double bond, then in the process of the contact reaction, addition reaction may also occur between the carbon-carbon double bond in the carboxylic acids represented by Formula $R_2$—COOH (and anhydrides thereof) and the carbon-carbon double bond in the reaction product of the amidation reaction, thereby obtaining the compound with $R_1$ (shown in Formula (I)) substituted by group Y. Although the present invention does not have particular limitation to this, the compound obtained under this case is also included in the emulsifier described in the present invention.

According to the present invention, preferably, the conditions of the contact reaction comprise: a temperature of 75-90° C., pH value of 7-9 and a time of 6-10 h. In order to make contact reaction more sufficient, this method may further comprise: contacting and reacting the reaction product of the amidation reaction with one or more of the carboxylic acids represented by Formula $R_2$—COOH and anhydrides thereof under a stirring rater of 200-500 r/min, and water is trapped by water knockout trap during the contact reaction.

According to the present invention, it should be noted that the emulsifier of the present invention may be one of the compounds represented by Formula (I), but if the foregoing preparation method is adopted, the emulsifier may also be one of the compounds represented by Formula (I) obtained through purifying and separating the product obtained by the foregoing preparation method. However, as more effective operation, the emulsifier of the present invention may be more of the compounds represented by Formula (I), i.e.: if the foregoing preparation method is adopted, the emulsifier may be a product directly obtained by the foregoing preparation method and is uses without purification. In other words, it may be understood that the emulsifier of the present invention is a product obtained by the foregoing method without purification.

According to the present invention, the rheological modifier is a dimer acid-organic amine copolymer comprising structural units from dimer acid, structural units from alkylamine, and structural units from arylamine, wherein, the dimer acid is a dimer of oleic acid and linoleic acid, the alkylamine is one or more of C10-C20 alkyl primary amines, the arylamine is aniline and aniline substituted by C1-C3 alkyl at one or more sites on benzene ring. Preferably, the rheological modifier is the dimer acid-organic amine copolymer. Wherein, the dimer acid is a dimer fatty acid containing two carboxyl groups, which is a dimer of oleic acid ($CH_3(CH_2)_7CH=CH(CH_2)_7COOH$) and linoleic acid ($CH_3(CH_2)_4CH=CHCH_2CH=CH(CH_2)_7COOH$). Such a dimer acid may be obtained with a conventional method according to the present invention, such as the method described in the article "Shulin Zhang, Synthesis and Application of Dimer Acid, *Fine Petrochemical Industry,* 1995", or may be a commercial product (preferably the purity is 98 wt % or higher). Preferably, the alkylamine is one or more of dodecyl primary amine, tridecyl primary amine, tetradecyl primary amine, pentadecyl primary amine, hexadecyl primary amine, heptadecyl primary amine, and octodecyl primary amine, more preferably is dodecyl primary amine and/or octodecyl primary amine. Preferably, the arylamine is one or more of aniline, 2-methylaniline, 3-methylaniline, 4-methylaniline, 2-ethylaniline, 3-ethylaniline, 4-ethylaniline, 2-propylaniline, 3-propylaniline, and 4-propylaniline, and more preferably is one or more of aniline, 2-methylaniline, 3-methylaniline, and 4-methylaniline.

In a preferred embodiment of the present invention, the dimer acid is a dimer of oleic acid and linoleic acid, the alkylamine is dodecyl primary amine or octodecyl primary amine, and the arylamine is aniline or 3-methylaniline.

According to the present invention, preferably, the molar ratio of the structural units from dimer acid to the structural units from alkylamine to the structural units from the dimer acid, structural units from the alkylamine and structural units from the arylamine is 1:0.3-1:0.2-1, more preferably 1:0.3-0.8:0.2-0.7, further more preferably 1:0.4-0.7:0.3-0.6.

Preferably, the weight-average molecular weight of the dimer acid-organic amine copolymer is 2,200-9,000 g/mol, and the absolute viscosity thereof is 20,000-150,000 cp p. Considering from the perspective of obtaining a composition more suitable for raising suspending power and temperature resistance of clay-free whole-oil-based drilling fluid, more preferably, the weight-average molecular weight of the dimer acid-organic amine copolymer is 4,000-9,000 g/mol, and the absolute viscosity thereof is 100,000-150,000 cp.

More preferably, the weight-average molecular weight of the dimer acid-organic amine copolymer is 5,000-9,000 g/mol, and the absolute viscosity thereof is 100,000-150,000 cp. In the present invention, weight-average molecular weight is measured by GPC (gel permeation chromatography), and absolute viscosity is measured by Brookfield viscometer.

According to the present invention, the dimer acid-organic amine copolymer as rheological modifier may be prepared by a conventional method of the ar. For example, the method for preparing the dimer acid-organic amine copolymer comprises: copolymerizing the dimer acid, the alkylamine and the arylamine. In this method, the dimer acid, alkylamine and arylamine have been described above, so no necessary details will be given herein.

According to the present invention, the foregoing copolymerization reaction among dimer acid, alkylamine and arylamine is mostly dehydration condensation reaction between carboxylic acids and amines. By copolymerization reaction among dimer acid, alkylamine and arylamine in the present invention alone, a dimer acid-organic amine copolymer with good performance may be obtained as a rheological modifier of whole-oil-based drilling fluid, but in order to obtain a rheological modifier with absolute viscosity and molecular weight more suitable for whole-oil-based drilling fluid, the molar ratio of the dimer acid, alkylamine and arylamine is preferably 1:0.3-1:0.2-1, more preferably 1:0.3-0.8:0.2-0.7, further more preferably 1:0.4-0.7:0.3-0.6.

According to the present invention, the copolymerization reaction may adopt a conventional method of the art as long as a dimer acid-organic amine copolymer that may be used as a rheological modifier of the composition can be obtained. Preferably, before copolymerization of dimer acid, alkylamine and arylamine, they are mixed to obtain a monomer mixture; then with the existence of concentrated sulfuric acid, the obtained monomer mixture takes copolymerization reaction.

According to the present invention, if the dimer acid, alkylamine and arylamine are mixed at first to obtain monomer mixture, the monomers can more sufficiently contact each other in the subsequent polymerization reaction. As the foregoing monomer mixture is sticky, preferably the mixing is conducted at higher temperature, and particularly preferably the adopted mixing conditions include: a temperature of 100-130° C. and a time of 20-30 min.

According to the present invention, when the foregoing concentrated sulfuric acid is used as a catalyst of the copolymerization reaction in the present invention, there is no particular limitation to its dose as long as it can catalyze the copolymerization reaction in the present invention. Preferably, based on the total weight of the dimer acid, alkylamine and arylamine, the dose of the concentrated sulfuric acid is 0.3-1 wt. %. The concentrated sulfuric acid may be a sulfuric acid solution with sulfuric acid concentration of 95 wt. % or above (preferably 98 wt. %).

According to the present invention, preferably, the conditions of the copolymerization reaction comprise: a temperature of 150-180° C. and a time of 2-6 h. More preferably, the conditions of the copolymerization reaction comprise: a temperature of 155-175° C. and a time of 2-6 h. Further more preferably, the conditions of the copolymerization reaction comprise: a temperature of 160-170° C. and a time of 2-6 h.

In order to promote the copolymerization reaction, byproduct water of copolymerization reaction may be removed from the reaction system. The method for removing byproduct water is a conventional method of the art, so no necessary details will be given here.

When the foregoing method is adopted to prepare dimer acid-organic amine copolymer, the rheological modifier may be either the dimer acid-organic amine copolymer prepared by the foregoing method, or a 50-70 wt. % solution obtained by directly using a diluent to dilute the dimer acid-organic amine copolymer prepared by the foregoing method (in other words, based on the total weight of the dimer acid-organic amine copolymer solution after dilution, the content of dimer acid-organic amine copolymer is 50-70 wt. %), or a rheological modifier of the present invention obtained by other methods well known in the art and containing the dimer acid-organic amine copolymer.

Those skilled in the art should understand that the product of copolymerization reaction is not separated in general and it is believed that all the adopted monomers basically take complete reaction and the product of copolymerization reaction is directly used as copolymer. Therefore, for the sake of convenience, the diluent may be directly added to the products of the copolymerization reaction after the copolymerization reaction in the method for preparing the foregoing dimer acid-organic amine copolymer is completed, and there is no need to purify and separate the dimer acid-organic amine copolymer in it. In a general sense, the dimer acid-organic amine copolymer referred to in the present invention is also the product of the copolymerization reaction without purification and separation, or the product of copolymerization reaction obtained after only byproduct water is removed as described above.

The diluent for example may be a diluent conventionally adopted in the art, such as: tall oil and/or tall oil fatty acid.

According to the present invention, the additive composition may further contain conventional additives used in drilling fluids in the art; for example, the additive composition may contain one or more of wetting agent, filtrate reducer, alkalinity regulator, and weighting agent, etc. When those additional additives are added into a drilling fluid, it can be deemed that the drilling fluid is formed in the form of the additive composition in the present invention; of course, those additional additives may also be deemed as separate components of the drilling fluid rather than the components of the composition in the present invention. All those cases are included in the scope of the present invention.

The present invention further provides a use of the composition as a drilling fluid additive in oil and gas drilling.

The present invention further provides an oil-based drilling fluid containing the above-mentioned composition.

When the composition provided in the present invention is applied in an oil-based drilling fluid, especially in a high-density oil-based drilling fluid with 2 g/cm$^3$ or higher density, the composition can attain a good viscosity reduction effect at a high temperature, even at a temperature higher than 200° C. There is no particular restriction on the content of the composition in the present invention; namely, the content of the composition may vary within a wide range. Of course, the content of the composition may be adjusted appropriately according to the specific well conditions and the drilling fluid. Preferably, based on 100 part by weight of oil phase in the oil-based drilling fluid, the content of the composition is 2.5-15 part by weight, more preferably is 3-13 part by weight, and even more preferably is 4-8 part by weight. On that basis, based on 100 part by weight of oil phase in the oil-based drilling fluid, the content of the viscosity reducer preferably is 0.5-3 part by weight. Based on 100 part by weight of oil phase in the oil-based drilling fluid, the amount of the emulsifier preferably is 1-5 part by weight. Based on 100 part by weight of oil phase in the oil-based drilling fluid, the amount of the rheological modifier preferably is 1-5 part by weight.

According to the present invention, the oil phase in the oil-based drilling fluid may be any conventional oil phase in the art, such as one or more of diesel oil and white oil (e.g., white oil 3# (220° C. flash point, 3 mm$^2$/s kinematic viscosity at 40° C., and specific gravity=0.85), or white oil 5# (220° C. flash point, 3.5 mm$^2$/s kinematic viscosity at 40° C., and specific gravity=0.85). In addition, CaCl$_2$ water solution (preferably CaCl$_2$ water solution at 20-40 wt % CaCl$_2$ concentration) in appropriate amount is added in the oil-based drilling fluid; for example, based on 100 part by weight of oil phase in the drilling fluid, the amount of the CaCl$_2$ water solution is 15-40 part by weight.

According to the present invention, the oil-based drilling fluid may further contain various conventional additives used in the art; for example, the oil-based drilling fluid may contain one or more of wetting agent, filtrate reducer, alkalinity regulator, and weighting agent, etc.

Wherein, the wetting agent can improve the wetting property of drilling fluid, and prevent complex downhole conditions, such as jamming of drilling tool, etc.; for example, the wetting agent may be one or more of modified phospholipid (e.g., FHGT-G modified phospholipid from Shanghai Youchuang Industrial Co., Ltd.) and a mixture of fatty glyceride and surfactant (e.g., FK-1), and preferably is FHGT-G modified phospholipid. More preferably, based on 100 part by weight of oil phase in the oil-based drilling fluid, the amount of the lubricant is 0.5-2 part by weight.

Wherein, the filtrate reducer can improve the fluid loss control and wall-building properties of drilling fluid; for example, the filtrate reducer may be one or more of oxidized asphalt, modified humic acid, and polymeric oil-based filtrate reducer (e.g., sulphonated polystyrene, HFLO oil-based filtrate reducer from Sichuan Honghua), and preferably is modified humic acid and/or polymeric oil-based filtrate reducer. Preferably, based on 100 part by weight of oil phase in the oil-based drilling fluid, the amount of the filtrate reducer is 1-3 part by weight.

Wherein, the alkalinity regulator has effects of stabilizing the emulsion and improving emulsion-breaking voltage; for example, the alkalinity regulator may be CaO. Preferably, based on 100 part by weight of oil phase in the oil-based drilling fluid, the amount of the alkalinity regulator is 2-5 part by weight.

Wherein, the weighting agent has an effect of adjusting the density of drilling fluid to desired density; for example, the weighting agent may be barite (e.g., barite with 90 wt % or higher barium sulfate content), etc. Preferably, based on 100 part by weight of oil phase in the oil-based drilling fluid, the amount of the weighting agent is 400-600 part by weight.

The above-mentioned additives may be commercial products, or may be prepared with conventional methods in the art. They will not be further detailed here.

According to the present invention, by adding the composition obtained in the present invention as an additive, the resultant oil-based drilling fluid with 2 g/cm$^3$ or higher density may still obtain 20% or higher viscosity reduction rate, and may even obtain 30% or higher viscosity reduction rate, preferably 40% or higher viscosity reduction rate, even after the oil-based drilling fluid is aged at 200° C.

The present invention further provides a use of the oil-based drilling fluid in oil and gas drilling.

Hereunder the present invention will be detailed in embodiments.

In the following examples and comparative examples:

The infrared spectrums are measured with a MAGNA-IR 560 Fourier transform infrared spectrometer from SpectraLab Scientific.

The $^1$H-NMR spectrums and $^{13}$C-NMR spectrums are measured with an AVANCE 400 NMR spectrometer from Bruker.

Emulsifier Preparation Example 1

(1) The reactants are mixed at a molar ratio of tetraethylene pentamine to linoleic acid=1:2.2 (i.e., the molar ratio of tetraethylene pentamine calculated by primary amine group to linoleic acid is 1:1.1), and stirred for 40 min at 250 r/min stirring rate, then the pH of the obtained mixture is adjusted to 9, and the mixture is kept at 230° C. for reaction for 3 h, while water is separated with a water separator in the process, next, the product is cooled to room temperature;

(2) The reaction product in the step (1) is mixed with propandioic acid (the molar ratio of the tetraethylene pentamine to the propandioic acid is 1:0.6), then the pH of the obtained mixture is adjusted to 8, next, the mixture is stirred at 400 r/min. at 90° C. for reaction for 6 h; thus, an emulsifier A1 is obtained. Detected and analyzed by infrared spectroscopy, $^1$H-NMR spectroscopy, and $^{13}$C-NMR spectroscopy, the emulsifier A1 contains amido groups, unsaturated double bonds, and carboxyl groups, and is in a comb structure.

Rheological Modifier Preparation Example 1

(1) Dimer acid (Pripol 1013 from Shanghai Heribit Chemical Co., Ltd., the same below), dodecyl primary amine, and aniline are added at 1:0.5:0.5 molar ratio into a reaction vessel, and the materials are stirred at 120±2° C. for 30 min.; thus, a homogeneous mixture of monomers is obtained;

(2) Concentrated sulfuric acid (at 98 wt. % concentration, the added amount is 0.5 wt. % of the weight of the mixture of monomers) is added by dropwise into the mixture of monomers (within about 2 min.), with a condensate drain device deployed, the mixture is kept at 160±5° C. for reaction for 2 h; the obtained reaction product is dimer acid-organic amine copolymer, which has 6,500 g/mol weight-average molecular weight and 125,000 cp absolute viscosity.

Tall oil diluent (tall oil F1 from Jinan Jinquan Chemical Co., Ltd, the same below) is added into the dimer acid-organic amine copolymer, to dilute the dimer acid-organic amine copolymer to 50 wt. % concentration; thus, a rheological modifier B1 described in the present invention is obtained, and the rheological modifier liquid is orange liquid.

Viscosity Reducer Preparation Example 1

(1) 12 g (120 mmol) methyl methacrylate and 1.27 g (3.49 mmol) chain-transfer agent 2-(dodecylsulfanylthiocarbonyl-sulfanyl)-2-methylpropionic acid (DMP) are dissolved in 25 mL benzene, and nitrogen is charged for 60 min; then 0.27 g (1.65 mmol) initiator 2,2'-azobis(2-methylpropionitrile) is added, and the mixture is kept at 60° C. for reaction for 4 h; next, the solvent and unreacted monomers are removed by reduced pressure distillation; thus, 11.4 g viscous liquid PMMA-1 is obtained. The number-average molecular weight of it is 3,800, and the molecular weight distribution index is 1.2.

(2) 23.4 g (100 mmol) (3-acrylamidopropyl)trimethylammonium chloride and 11.4 g PMMA-1 are dissolved in 70 mL DMF, and nitrogen is charged for 60 min.; next, 0.08 g (0.49 mmol) initiator 2,2'-azobis(2-methylpropionitrile) is added, and the mixture is kept at 100° C. for reaction for 24 h, and then cooled to room temperature (approx. 25° C.) to terminate the polymerization. Let the crude product precipitate in absolute methanol, and that operation is repeated for three times; then, the precipitate is filtered and dried; thus, a double-block copolymer is obtained, i.e., a viscosity reducer TFO-1.

Wherein, the double-block copolymer is a double-block copolymer composed of PMMA and (3-acrylamidopropyl) trimethylammonium chloride polymeric blocks, the number-average molecular weight of the double-block copolymer is 11,000, and the molar ratio of the content of the structural units represented by the formula (1) ($R^1$ is methyl, $R^{1'}$ is H, $R^{2'}$ is H, $R^2$ is —COOCH$_3$) to the content of the structural units represented by the formula (2) ($R^4$ and $R^{4'}$ are H, X is selected from —NH—, $R^5$ is selected from —CH$_2$—CH$_2$—CH$_2$—, $R^6$ is selected from methyl, X is selected from Cl) is 1:0.8.

Viscosity Reducer Preparation Example 2

(1) 16 g (110 mmol) dimethyl maleate and 1.09 g (3 mmol) chain-transfer agent 2-(dodecylsulfanylthiocarbonyl-sulfanyl)-2-methylpropionic acid (DMP) are dissolved in 40 mL benzene, and nitrogen is charged for 50 min; then 0.32 g (1.2 mmol) initiator 2,2'-azobis[2-methylpropionamidine] dihydrochloride is added, and the mixture is kept at 70° C. for reaction for 3.5 h; next, the solvent and unreacted monomers are removed by reduced pressure distillation; thus, 16.4 g viscous liquid PDM-1 is obtained. The number-average molecular weight of it is 5,400, and the molecular weight distribution index is 1.3.

(2) 29.2 g (130 mmol) (3-acrylamidopropyl)trimethylammonium chloride and 16.4 g PDM-1 are dissolved in 60 mL DMF, and nitrogen is charged for 50 min; next, 0.14 g (0.5 mmol) initiator 2,2'-azobis[2-methylpropionamidine]dihydrochloride is added, and the mixture is kept at 110° C. for reaction for 22 h, and then cooled to room temperature to terminate the polymerization. Let the crude product precipitate in absolute methanol, and that operation is repeated for three times; then, the precipitate is filtered and dried; thus, a double-block copolymer is obtained, i.e., a viscosity reducer TFO-2.

Wherein, the double-block copolymer is a double-block copolymer composed of PDM and (3-acrylamidopropyl) trimethylammonium chloride polymeric blocks, the number-average molecular weight of the double-block copolymer is 15,000, and the molar ratio of the content of the structural units represented by the formula (1) ($R^1$ and $R^{1'}$ are H, $R^{2'}$ and $R^2$ are —COOCH$_3$) to the content of the structural units represented by the formula (2) ($R^4$ and $R^{4'}$ are H, X is selected from —NH—, $R^5$ is selected from —CH$_2$—CH$_2$—CH$_2$—, $R^6$ is selected from methyl, X is selected from Cl) is 1:1.1.

Viscosity Reducer Preparation Example 3

(1) PMMA-1 is prepared through the step (1) described in the viscosity reducer preparation example 1.

(2) 36.6 g (180 mmol) (2-methacryloyloxyethyl)trimethylammonium chloride and 11.4 g PMMA-1 are dissolved in 80 mL DMF, and nitrogen is charged for 70 min; next 0.1 g (0.61 mmol) initiator 2,2'-azobis(2-methylpropionitrile) is added, and the mixture is kept at 120° C. for reaction for 18 h, and then cooled to room temperature to terminate the polymerization. Let the crude product precipitate in absolute methanol, and that operation is repeated for three times; then, the precipitate is filtered and dried; thus, a double-block copolymer is obtained, i.e., a viscosity reducer TFO-3.

Wherein, the double-block copolymer is a double-block copolymer composed of PMMA and (2-methacryloyloxyethyl)trimethylammonium chloride polymeric blocks, the number-average molecular weight of the double-block copolymer is 16,000, and the molar ratio of the content of the structural units represented by the formula (1) ($R^1$ is methyl, $R^{1'}$ is H, $R^{2'}$ is H, $R^2$ is —COOCH$_3$) to the content of the structural units represented by the formula (2) ($R^4$ is methyl, $R^{4'}$ is H, X is selected from —O—, $R^5$ is selected from —$CH_2$—$CH_2$—, $R^6$ is selected from methyl, X' is selected from Cl) is 1:1.5.

Viscosity Reducer Preparation Example 4

(1) 12 g (120 mmol) methyl methacrylate and 1.64 g (4.5 mmol) chain-transfer agent 2-(dodecylsulfanylthiocarbonyl-sulfanyl)-2-methylpropionic acid (DMP) are dissolved in 25 mL benzene, and nitrogen is charged for 60 min; then 0.33 g (2 mmol) initiator 2,2'-azobis(2-methylpropionitrile) is added, and the mixture is kept at 65° C. for reaction for 3 h; next, the solvent and unreacted monomers are removed by reduced pressure distillation; thus, 11.5 g viscous liquid PMMA-2 is obtained. The number-average molecular weight of it is 2,800, and the molecular weight distribution index is 1.15.

(2) The step (2) described in the viscosity reducer preparation example 1 is used, but 11.5 g PMMA-2 is used to replace PMMA-1; thus, a viscosity reducer TFO-4 is obtained.

Wherein, the double-block copolymer is a double-block copolymer composed of PMMA and (3-acrylamidopropyl) trimethylammonium chloride polymeric blocks, the number-average molecular weight of the double-block copolymer is 8,500, and the molar ratio of the content of the structural units represented by the formula (1) ($R^1$ is methyl, $R^{1'}$ is H, $R^{2'}$ is H, $R^2$ is —$COOCH_3$) to the content of the structural units represented by the formula (2) ($R^4$ and $R^{4'}$ are H, X is selected from —NH—, $R^5$ is selected from —$CH_2$—$CH_2$—$CH_2$—, $R^6$ is selected from methyl, X' is selected from C1) is 1:0.9.

Viscosity Reducer Preparation Example 5

(1) 12 g (120 mmol) methyl methacrylate and 1.1 g (3 mmol) chain-transfer agent 2-(dodecylsulfanylthiocarbonyl-sulfanyl)-2-methylpropionic acid (DMP) are dissolved in 25 mL benzene, and nitrogen is charged for 60 min; then 0.2 g (1.2 mmol) initiator 2,2'-azobis(2-methylpropionitrile) is added, and the mixture is kept at 55° C. for reaction for 6 h; next, the solvent and unreacted monomers are removed by reduced pressure distillation; thus, 11 g viscous liquid PMMA-3 is obtained. The number-average molecular weight of it is 4,500, and the molecular weight distribution index is 1.2.

(2) The step (2) described in the viscosity reducer preparation example 1 is used, but 11 g PMMA-3 is used to replace PMMA-1; thus, a viscosity reducer TFO-5 is obtained.

Wherein, the double-block copolymer is a double-block copolymer composed of PMMA and (3-acrylamidopropyl) trimethylammonium chloride polymeric blocks, the number-average molecular weight of the double-block copolymer is 14,000, and the molar ratio of the content of the structural units represented by the formula (1) ($R^1$ is methyl, $R^{1'}$ is H, $R^{2'}$ is H, $R^2$ is —$COOCH_3$) to the content of the structural units represented by the formula (2) ($R^4$ and $R^{4'}$ are H, X is selected from —NH—, $R^5$ is selected from —$CH_2$—$CH_2$—$CH_2$—, $R^6$ is selected from methyl, X' is selected from Cl) is 1:0.9.

Viscosity Reducer Preparation Example 6

(1) 12 g (120 mmol) methyl methacrylate and 2.18 g (6 mmol) chain-transfer agent 2-(dodecylsulfanylthiocarbonyl-sulfanyl)-2-methylpropionic acid (DMP) are dissolved in 25 mL benzene, and nitrogen is charged for 60 min; then, 0.39 g (2.4 mmol) initiator 2,2'-azobis(2-methylpropionitrile) is added, and the mixture is kept at 75° C. for reaction for 2.5 h; next, the solvent and unreacted monomers are removed by reduced pressure distillation; thus, 11.6 g viscous liquid PMMA-4 is obtained. The number-average molecular weight of it is 2,000, and the molecular weight distribution index is 1.2.

(2) The step (2) described in the viscosity reducer preparation example 1 is used, but 11.6 g PMMA-4 is used to replace PMMA-1; thus, a viscosity reducer TFO-6 is obtained.

Wherein, the double-block copolymer is a double-block copolymer composed of PMMA and (3-acrylamidopropyl) trimethylammonium chloride polymeric blocks, the number-average molecular weight of the double-block copolymer is 6,000, and the molar ratio of the content of the structural units represented by the formula (1) ($R^1$ is methyl, $R^{1'}$ is H, $R^{2'}$ is H, $R^2$ is —$COOCH_3$) to the content of the structural units represented by the formula (2) ($R^4$ and $R^{4'}$ are H, X is selected from —NH—, $R^5$ is selected from —$CH_2$—$CH_2$—$CH_2$—, $R^6$ is selected from methyl, X' is selected from C1) is 1:0.9.

Viscosity Reducer Preparation Example 7

(1) 12 g (120 mmol) methyl methacrylate and 0.87 g (2.4 mmol) chain-transfer agent 2-(dodecylsulfanylthiocarbonyl-sulfanyl)-2-methylpropionic acid (DMP) are dissolved in 25 mL benzene, and nitrogen is charged for 60 min; then, 0.16 g (1 mmol) initiator 2,2'-azobis(2-methylpropionitrile) is added, and the mixture is kept at 50° C. for reaction for 6 h; next, the solvent and unreacted monomers are removed by reduced pressure distillation; thus, 11.2 g viscous liquid PMMA-5 is obtained. The number-average molecular weight of it is 8,000, and the molecular weight distribution index is 1.3.

(2) The step (2) described in the embodiment 1 is used, but 11.2 g PMMA-5 is used to replace PMMA-1; thus, a viscosity reducer TFO-7 is obtained.

Wherein, the double-block copolymer is a double-block copolymer composed of PMMA and (3-acrylamidopropyl) trimethylammonium chloride polymeric blocks, the number-average molecular weight of the double-block copolymer is 24,000, and the molar ratio of the content of the structural units represented by the formula (1) ($R^1$ is methyl, $R^{1'}$ is H, $R^{2'}$ is H, $R^2$ is —$COOCH_3$) to the content of the structural units represented by the formula (2) ($R^4$ and $R^{4'}$ are H, X is selected from —NH—, $R^5$ is selected from —$CH_2$—$CH_2$—$CH_2$—, $R^6$ is selected from methyl, X' is selected from Cl) is 1:0.9.

Comparative Example 1 of Viscosity Reducer 12 g (120 mmol) methyl methacrylate, 23.4 g (100 mmol) (3-acrylamidopropyl) trimethylammonium chloride, and 2.54 g (7 mmol) chain-transfer agent 2-(dodecylsulfanylthiocarbonyl sulfanyl)-2-methylpropionic acid (DMP) are dissolved in 70 mL DMF, and nitrogen is charged for 60 min; then, 0.7 g (4.2 mmol) initiator 2,2'-azobis(2-methylpropionitrile) is added, and the mixture is kept at 100° C. for reaction for 15 h, and then cooled to room temperature to terminate the polymerization. Let the crude product precipitate in absolute methanol, and that operation is repeated for three times; then, the precipitate is filtered and dried; thus, a random copolymer is obtained, i.e., a viscosity reducer D1. Wherein, the number-average molecular weight of the random copolymer is 20,000, and the molar ratio of the content of the structural units represented by the formula (1) ($R^1$ is methyl, $R^{1'}$ is H, $R^{2'}$ is H, $R^2$ is —COOCH$_3$) to the content of the structural units represented by the formula (2) ($R^4$ and $R^{4'}$ are H, X is selected from —NH—, $R^5$ is selected from —CH$_2$—CH$_2$—CH$_2$—, $R^6$ is selected from methyl, X is selected from Cl) is 1:0.8.

Drilling Fluid Example 1

The example are provided to describe the composition and the drilling fluid in the present invention.

The formation of the drilling fluid is: 100 part by weight of diesel oil (diesel oil 0# from Beijing Jinbaoli, the same below), 20 part by weight of CaCl$_2$ water solution (the CaCl$_2$ concentration in the solution is 30 wt. %), 1 part by weight of viscosity reducer TFO-1, 3 part by weight of emulsifier A1, 2 part by weight of rheological modifier B1, 1 part by weight of modified phospholipid wetting agent (e.g., FHGT-G modified phospholipid from Shanghai Youchuang Industrial Co., Ltd., the same below), 2 part by weight of polymeric oil-based filtrate reducer (HFLO oil-based filtrate reducer from Sichuan Honghua), 3 part by weight of CaO, 450 part by weight of barite (from Sichuan Zhengrong, the same below); thus, a drilling fluid X1 is prepared, and the density of it is 2.6 g/cm$^3$.

Drilling Fluid Examples 2-7

These examples are provided to describe the composition and the drilling fluid in the present invention.

The formation used in the drilling fluid example 1 is used, but the difference is that the viscosity reducers TFO-2 to TFO-7 are used respectively to replace the viscosity reducer TFO-1; thus, drilling fluids X2-X7 are obtained, and their density is 2.6 g/cm$^3$.

Comparative Example 1

The formation used in the drilling fluid example 1 is used, but the viscosity reducer TFO-1 is not added; thus, a drilling fluid DX1 is prepared.

Comparative Example 2

The formation used in the drilling fluid example 1 is used, but the difference is that the viscosity reducer D1 is used to replace the viscosity reducer TFO-1; thus, a drilling fluid DX2 is prepared.

Comparative Example 3

The formation used in the drilling fluid example 1 is used, but the difference is that the PMMA-1 is used to replace the viscosity reducer TFO-1; thus, a drilling fluid DX3 is prepared.

Comparative Example 4

The formation used in the drilling fluid example 1 is used, but the difference is that the emulsifier A1 is not added; thus, a drilling fluid DX4 is prepared.

Test Example 1

The above-mentioned drilling fluids are stirred at a high speed for 20 min respectively; then, the drilling fluids are kept at 55° C., and their apparent viscosity (AV), plastic viscosity (PV), yield point (YP) are measured, and the viscosity reduction rate is calculated respectively; then, the test objects are loaded into an aging can and are aged at 200° C. for 16 h, and then are cooled down to room temperature, transferred into a stirring cup and stirred at a high speed for 20 min respectively; then, the drilling fluids are kept at 55° C., and their rheological properties (AV, PV, YP and viscosity reduction rate) are measured. The results are shown in Table 1.

The plastic viscosity (PV) is measured with a FANN six-speed viscosity meter with the method specified in the national standard GB/T29170-2012, in unit of mPa·s, $PV=\theta_{600}-\theta_{300}$.

The apparent viscosity (AV) is measured with a FANN six-speed viscosity meter with the method specified in the national standard GB/T29170-2012, in unit of mPa·s, $A=½\theta_{600}$.

The yield point (YP) is measured with a FANN six-speed viscosity meter with the method specified in the national standard GB/T29170-2012 $YP=0.5(2\theta_{300}-\theta_{600})$, in, unit of Pa.

The viscosity reduction effect of the viscosity reducer is represented by plastic viscosity reduction rate $R_{PV}$ (hereinafter referred to as viscosity reduction rate), which is calculated as follows:

$$R_{PV}=[(PV_0-PV)/PV_0]\times100\%,$$

where, $R_{PV}$ refers to viscosity reduction rate, %;

$PV_0$ refers to plastic viscosity of the drilling fluid without the viscosity reducer;

PV refers to plastic viscosity of the drilling fluid with the viscosity reducer (i.e., drilling fluid DX1).

TABLE 1

| Drilling Fluid | AV mPa·s | PV mPa·s | YP Pa | $R_{pv}$ % |
|---|---|---|---|---|
| Before aging ||||||
| DX1 | 100 | 92 | 8 | / |
| X1 | 56 | 49 | 7 | 46.7 |
| X2 | 65 | 58 | 7 | 37.0 |
| X3 | 54 | 47 | 7 | 48.9 |
| X4 | 57 | 49 | 8 | 46.7 |
| X5 | 59 | 51 | 8 | 44.6 |
| X6 | 76 | 68 | 8 | 26.1 |
| X7 | 74 | 66 | 8 | 28.3 |
| DX2 | 92 | 83 | 9 | 9.8 |
| DX3 | 97 | 87 | 10 | 5.4 |
| DX4 | 74 | 70 | 4 | 23.9 |
| After hot aging at 200° C. for 16 h ||||||
| DX1 | 87 | 80 | 7 | / |
| X1 | 54 | 48 | 6 | 40.0 |
| X2 | 62 | 56 | 6 | 30.0 |
| X3 | 51 | 44 | 7 | 45.0 |
| X4 | 54 | 48 | 6 | 40.0 |
| X5 | 56 | 50 | 6 | 37.5 |
| X6 | 71 | 64 | 7 | 20.0 |
| X7 | 69 | 63 | 6 | 21.2 |
| DX2 | 83 | 74 | 9 | 7.5 |
| DX3 | 88 | 78 | 10 | 2.5 |
| DX4 | 76 | 74 | 2 | 7.5 |

Note:
"/" represents without testing.

It is seen from the data in Table 1: the viscosity reduction rate of the oil-based drilling fluid that contains the composition provided in the present invention as an additive can be up to 20% or above. The composition provided in the present invention is suitable for viscosity reduction of common oil-based drilling fluids, and can achieve a viscosity reduction rate by 30% or higher, or even by 40% or higher, while having little impact on the shearing force (preferably dynamic shearing force within 6-8 Pa range) of the oil-based drilling fluids. In addition, the viscosity reduction performance of the composition still has little change even after the composition is aged at 200° C.; hence, the composition has high thermostability.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be noted that the specific technical features described in above embodiments can be combined in any appropriate form, provided that there is no conflict. To avoid unnecessary repetition, the possible combinations are not described specifically in the present invention. Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A drilling fluid additive composition comprising a viscosity reducer, an emulsifier, and a rheological modifier, wherein:

a) the viscosity reducer is a double-block copolymer comprising a block A and a block B, wherein the block A is composed of structural units represented by formula (1), the block B is composed of structural units represented by formula (2), and the number-average molecular weight of the block A is 1,500-10,000;

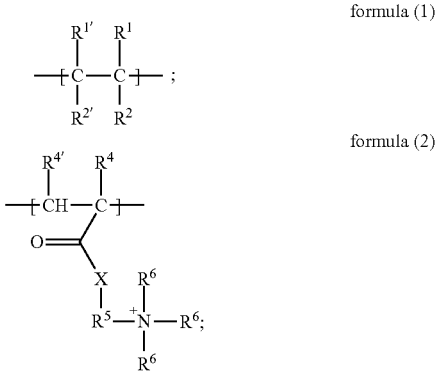

wherein $R^1$, $R^{1'}$, $R^4$, $R^{4'}$, and $R^6$ are independently selected from H or C1-C6 alkyl; $R^2$ and $R^{2'}$ are independently selected from H, C1-C6 alkyl, —O—C(O)—$R^3$ or —COOR$^3$, and at least one of $R^2$ and $R^{2'}$ is selected from —O—C(O)—$R^3$ or —COOR$^3$, and $R^3$ is selected from C1-C6 alkyl; $R^5$ is selected from C1-C8 alkylene; X is selected from —NH— or —O—;

b) the emulsifier is one or more of compounds represented by formula (I);

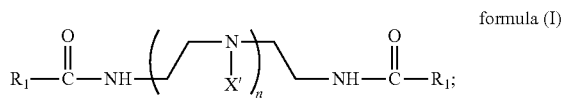

wherein each of the two $R_1$ groups is independently selected from C14-C30 alkyl optionally substituted by group Y or C14-C30 unsaturated alkyl optionally substituted by group Y, and the group Y is independently selected from the following:

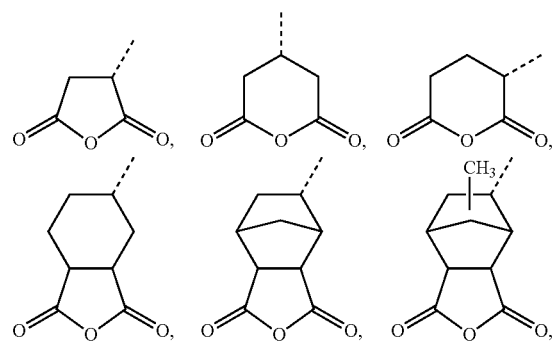

n is 1-8;
wherein each X' is independently selected from H or —C(O)—R2, and at least one X' is —C(O)—R2, R2 is selected from carboxyl, C1-C6 alkyl, C3-C8 cycloalkyl, C1-C6 alkyl substituted by carboxyl, C3-C8 cycloalkyl substituted by carboxyl, C3-C8 cycloalkyl substituted by carboxyl and C1-C4 alkyl, C2-C6 unsaturated alkyl, C3-C8 unsaturated cycloalkyl, C2-C6 unsaturated alkyl substituted by carboxyl, or C3-C8 unsaturated cycloalkyl substituted by carboxyl and C1-C4 alkyl;

c) the rheological modifier is a dimer acid-organic amine copolymer comprising structural units from dimer acid, structural units from an alkylamine and structural units from an arylamine, wherein the dimer acid is a dimer of oleic acid and linoleic acid, the alkylamine is one or more of C10-C20 alkyl primary amines, and the arylamine is one or more of aniline and aniline substituted by C1-C3 alkyl at one or more sites on benzene ring.

2. The composition according to claim 1, wherein a weight ratio of the viscosity reducer to the emulsifier to the rheological modifier is 100:100-500:100-500.

3. The composition according to claim 1, wherein a weight ratio of the viscosity reducer to the emulsifier to the rheological modifier is 100:200-400:100-300.

4. The composition according to claim 1, wherein $R^1$, $R^{1'}$, $R^4$, $R^{4'}$ and $R^6$ are independently selected from H or C1-C4 alkyl; $R^2$ and $R^{2'}$ are independently selected from H, C1-C4 alkyl, —O—C(O)—$R^3$ or —COOR$^3$, and at least one of $R^2$ and $R^{2'}$ is selected from —O—C(O)—$R^3$ or —COOR$^3$, and $R^3$ is selected from C1-C4 alkyl; and $R^5$ is selected from C1-C6 alkylene.

5. The composition according to claim 1, wherein $R^1$, $R^{1'}$, $R^4$, $R^{4'}$ and $R^6$ are independently selected from H, methyl, ethyl, n-propyl, isopropyl or n-butyl; $R^2$ and $R^{2'}$ are independently selected from H, methyl, ethyl, n-propyl, isopropyl, n-butyl, —O—C(O)—$CH_3$, —O—C(O)—$CH_2CH_3$, —O—C(O)—$CH_2CH_2CH_3$, —O—C(O)—$CH(CH_3)CH_3$, —COOCH₃, —COOCH₂CH₃, —COOCH₂CH₂CH₃ or —COOCH(CH₃)CH₃, and at least one of R² and R²' is selected from —O—C(O)—CH₃, —O—C(O)—CH₂CH₃, —O—C(O)—CH₂CH₂CH₃, —O—C(O)—CH(CH₃)CH₃, —COOCH₃, —COOCH₂CH₃, —COOCH₂CH₂CH₃ or —COOCH(CH₃)CH₃; and R⁵ is selected from —CH₂—, —CH₂—CH₂—, —CH₂—CH₂—CH₂—, —CH(CH₃)—CH₂—, —CH₂—CH(CH₃)—, —CH₂—(CH₂)₂—CH₂—, —CH₂—CH(CH₃)—CH₂—, —C(CH₃)₂—CH₂—, —CH₂—C(CH₃)₂—, —CH₂—(CH₂)₃—CH₂— or —CH₂—(CH₂)₄—CH₂—.

6. The composition according to claim 1, wherein the double-block copolymer has a molar ratio of the structural units represented by the formula (1) to the structural units represented by the formula (2) of 1:0.2-5; and wherein the number-average molecular weight of the double-block copolymer is 5,000-25,000.

7. The composition according to claim 1, wherein the double-block copolymer has a molar ratio of the structural units represented by the formula (1) to the structural units represented by the formula (2) of 1:0.5-2; and wherein the number-average molecular weight of the double-block copolymer is 6,000-24,000.

8. The composition according to claim 7, wherein the double-block copolymer has a molar ratio of the structural units represented by the formula (1) to the structural units represented by the formula (2) of 1:0.6-1.6; and wherein the number-average molecular weight of the double-block copolymer is 8,500-16,000.

9. The composition according to claim 1, wherein in the formula (I), each of the two R₁ groups is independently selected from C14-C20 alkyl optionally substituted by group Y or C14-C20 unsaturated alkyl optionally substituted by group Y;
n is 1-6;
R₂ is selected from carboxyl, C1-C4 alkyl, C4-C6 cycloalkyl, C1-C4 alkyl substituted by carboxyl, C4-C6 cycloalkyl substituted by carboxyl, C4-C6 cycloalkyl substituted by carboxyl and methyl, C2-C4 unsaturated alkyl, C4-C6 unsaturated cycloalkyl, C2-C4 unsaturated alkyl substituted by carboxyl, or C4-C7 unsaturated cycloalkyl substituted by carboxyl and methyl.

10. The composition according to claim 9, wherein in the formula (I), each of the two R₁ groups is independently selected from C15-C18 alkyl optionally substituted by group Y or C15-C18 unsaturated alkyl optionally substituted by group Y; and
n is 1-4.

11. The composition according to claim 1, wherein the alkylamine is one or more of dodecyl primary amine, tridecyl primary amine, tetradecyl primary amine, pentadecyl primary amine, hexadecyl primary amine, heptadecyl primary amine, and octodecyl primary amine; and
wherein the arylamine is one or more of aniline, 2-methylaniline, 3-methylaniline, 4-methylaniline, 2-ethylaniline, 3-ethylaniline, 4-ethylaniline, 2-propylaniline, 3-propylaniline, and 4-propylaniline.

12. The composition according to claim 1, wherein a molar ratio of the structural units from dimer acid to the structural units from alkylamine to the structural units from arylamine is 1:0.3-1:0.2-1;
wherein the dimer acid-organic amine copolymer has a weight-average molecular weight of 2,200-9,000 g/mol; and
wherein the dimer acid-organic amine copolymer has an absolute viscosity of 20,000-150,000 cp.

13. The composition according to claim 12, wherein a molar ratio of the structural units from dimer acid to the structural units from alkylamine to the structural units from arylamine is 1:0.3-0.8:0.2-0.7;
wherein the dimer acid-organic amine copolymer has a weight-average molecular weight of 4,000-9,000 g/mol; and
wherein the dimer acid-organic amine copolymer has an absolute viscosity of 100,000-150,000 cp.

14. An oil-based drilling fluid containing the composition according to claim 1.

15. The drilling fluid according to claim 14, wherein based on 100 part by weight of oil phase in the drilling fluid, the content of the composition is 2.5-15 part by weight.

* * * * *